United States Patent [19]
Ridgewell et al.

[11] Patent Number: 5,462,406
[45] Date of Patent: Oct. 31, 1995

[54] CYCLODIAL PROPULSION SYSTEM

[75] Inventors: Barry A. Ridgewell, Delta; Miles Fenton, North Vancouver, both of Canada

[73] Assignee: Vitron Systems Inc., Vancouver, Canada

[21] Appl. No.: 108,449

[22] Filed: Aug. 19, 1993

[51] Int. Cl.$^6$ ........................................... F03D 3/06
[52] U.S. Cl. ............................... 416/111; 416/108
[58] Field of Search .......................... 416/108, 110, 416/111

[56] References Cited

U.S. PATENT DOCUMENTS

| | | |
|---|---|---|
| 3,611,826 | 10/1971 | Fisher et al. . |
| 3,704,961 | 12/1972 | Fork et al. . |
| 4,168,439 | 9/1979 | Palma ........................ 416/111 |
| 4,210,299 | 7/1980 | Chabonat . |
| 4,380,417 | 4/1983 | Fork ........................... 416/111 |
| 4,424,002 | 1/1984 | Nishiyama ................. 416/111 |
| 4,609,827 | 9/1986 | Nepple ....................... 416/111 |
| 4,664,636 | 5/1987 | Blickle et al. . |
| 4,752,258 | 6/1988 | Hochleitner et al. . |

FOREIGN PATENT DOCUMENTS

| | | |
|---|---|---|
| 418486 | 10/1934 | United Kingdom . |
| 438317 | 11/1935 | United Kingdom . |
| 501467 | 2/1939 | United Kingdom . |
| 504877 | 5/1939 | United Kingdom . |

OTHER PUBLICATIONS

J. M. Voith GmbH, "The Voith–Schneider Propeller and its Incorporation in Ship Design."

Primary Examiner—John T. Kwon
Attorney, Agent, or Firm—Nixon & Vanderhye

[57] ABSTRACT

The present invention provides an offset control mechanism and a variable blade-pitch mechanical kinematic system for cycloidal propellers. This is achieved by the concentric positioning of the drive shaft, the variable offset circular guide track, the eccentric X-Y slide plates, the propeller hub and the variable blade-pitch kinematic linkages, all about the axis of propeller rotation. The control actuation system is free-flooded in water and non-rotating, yet in close proximity to the rotating propeller hub. The pitch of each propeller blade is cyclically varied by the kinematic levers on each blade following a circular guide track during each revolution. Additionally, the circlar track swivel guide in the blade lever kinematics can also lever a trailing blade-flap to provide additional cyclic propeller lift in the direction of motion. The propeller improvements include a low-drag propeller hub and a variable-pitch blade ground plane ring about the ends of the blades.

12 Claims, 6 Drawing Sheets

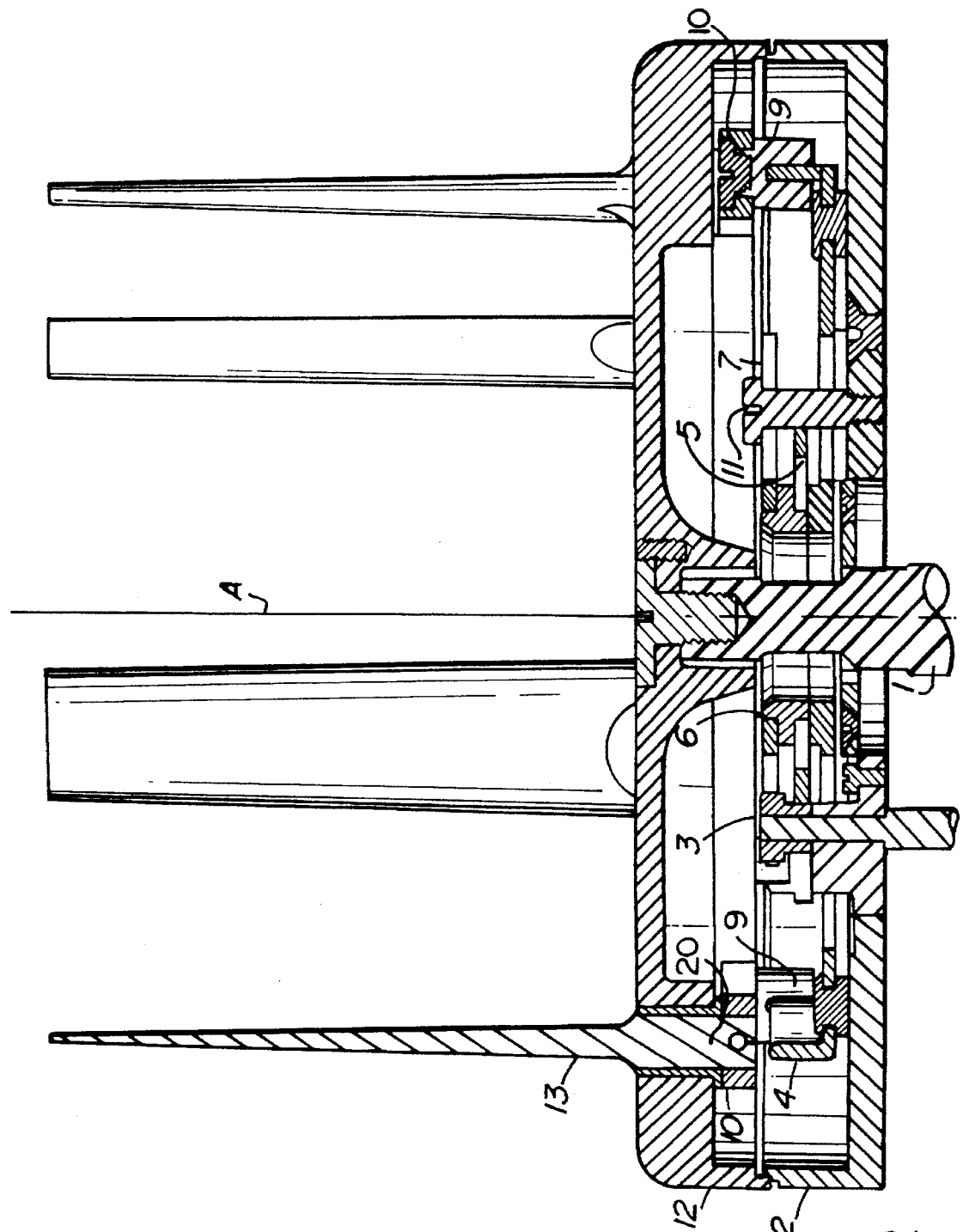

CYCLODIAL PROPULSION SYSTEM

TECHNICAL FIELD

The present invention relates to cycloidal propulsion systems and particularly relates to marine cycloidal propulsion systems having a novel and improved propeller blade-pitch kinematics system.

BACKGROUND

Marine cycloidal propellers were originally developed in the early 1920's and are commonly known as Voith-Schneider propulsion systems. The cycloidal propeller derives its name from the cycloidal path that individual propeller blades on its propeller hub circumscribe as the propeller moves through the water. These unique propellers have blades which extend parallel to the rotational axis of the propeller hub and are pivotal about discrete blade axes parallel to the propeller rotational axis. In propulsion systems of this type, the direction and magnitude of thrust may be varied along any line normal to the rotational axis of the hub, thereby obviating the need for directional rudders. In contrast, traditional helical-screw propellers have blades which are perpendicular to the rotational axis and can only vary the magnitude of thrust along their axis, thereby requiring rudders to change the direction of thrust.

In a cycloidal propeller assembly, the propeller blades operate as lifting surfaces. The angles of attack of these blades continuously varies from zero to a maximum in the desired direction of travel, then back to zero during each forward and aft half-cycle or half propeller rotation. The lift force varies as each blade circumscribes the orbital path and the time average of this force vector, for all blades over a complete revolution, is equal to the direction and magnitude of the propeller thrust. The blades which normally project downward into the water flow ape usually mounted in a recessed rotating propeller hub which orbits about an axis normal to the hull.

Cycloidal propellers generally include an offset control mechanism, a power drive and gear reduction system, and a rotating propeller hub which includes the variable-pitch propeller blades. In existing cycloidal propellers, the offset control mechanism is on top of the drive system and consists of two orthogonal hydraulic servo motors that pivot a vertical control rod-end off its concentric axis with the rotating propeller, and levers the lower control rod-end in the rotating propeller hub, in a direction perpendicular to the direction of thrust and at a selected magnitude offset. This action, in turn, causes an offset ring in the lower rotating hub to continuously adjust the various blade bell-cranks and/or crank-type kinematics to cyclically vary each variable-pitch blade angle. The offset control mechanism, the mechanical kinematics blade-pitch linkage systems and the propeller hub are large, complex and mechanically inefficient.

DISCLOSURE OF THE INVENTION

The present invention provides a cycloidal propulsion system which has a simple and efficient thrust control actuation system, variable-pitch propeller and blade-flap mechanical kinematics system, propeller blade support hub and blade tip ground plane ring. The control actuation system is mounted on a fixed-base plate, free flooded in a fluid, e.g., water, and in close proximity to the internal rotating propeller hub. Offset control actuation is achieved by two rotary servo motor shafts actuating two orthogonal, linear X-Y sliding plates which collectively position a circular guide track or vector ring in the selected direction and at an offset distance proportional to the magnitude of thrust. The variable-pitch-blades which are supported by the rotating propeller hub have attached to their blade pivot ends or shanks, trailing levers with swivel guides that slide around the variable offset vector ring and cyclically vary individual propeller blade angles-of-attack. The trailing lever swivel guide can also lever a hinged blade-flap on each variable-pitch blade cyclically to provide additional lift in the direction of motion. The mechanical kinematics of the in-water variable-pitch blade offset control mechanism consists only of trailing levers and swivel guides. Additionally, improvements in the propeller design include a low-drag propeller hub and a variable-pitch propeller ground plane ring about the ends of the blades which provides a nozzle effect by reducing fluid losses from the blade ends at slow propeller speeds thereby improving overall propeller efficiency, reducing fouling, and enabling use of continuous cross-sectional blades along their full length, thus increasing blade surface area and resulting in additional thrust.

In a preferred embodiment according to the present invention, there is provided a cycloidal propeller system comprising a fixed base, a propeller hub rotatable about a central axis and mounting a plurality of circumferentially spaced propeller blades for rotation therewith about the central axis, the hub mounting the blades for pivotal movement about blade axes generally parallel to the central axis whereby the axes of the blades define a circular orbit upon rotation of the hub about the central axis and a member carrying a circular track having an axis extending in the direction of the central axis and carried by the base for non-rotational movement in a plane normal to the central axis whereby the axis of the track can be offset from or lie coincident with the central axis. Means are provided for moving the member in the plane to offset the axis of the track relative to the central axis. Each blade has a lever and a guide carried by the hub for rotation therewith about the central axis, the guides being engageable with the track such that the guides and the levers change the angles of attack of the blades in response to movement of the member in the plane offsetting the track axis relative to the central axis thereby to produce thrust in a predetermined direction in response to rotation of the blades about the central axis.

In a further preferred embodiment according to the present invention, there is provided a cycloidal propeller system comprising a fixed base, a propeller hub rotatable about a central axis and mounting a plurality of circumferentially spaced propeller blades for rotation therewith about the central axis, the hub mounting the blades for pivotal movement about blade axes generally parallel to the central axis whereby the axes of the blades define a circular orbit upon rotation of the hub about the central axis and a member carrying a circular guide having an axis extending in the direction of the central axis and carried by the base for non-rotational movement in a plane normal to the central axis whereby the axis of the guide can be offset from or lie coincident with the central axis. Also provided are means for moving the member in the plane to offset the axis of the guide relative to the central axis and means carried by the hub for rotation therewith about the central axis and engageable with the guide and the blades for changing the pitch of the blades in response to movement of the member in the plane offsetting the guide axis relative to the central axis thereby to produce thrust in a predetermined direction in response to rotation of the blades about the central axis.

BRIEF DESCRIPTION OF THE DRAWINGS

FIG. 2 is a cross-sectional view of the cycloidal propeller system;

BEST MODE FOR CARRYING OUT THE INVENTION

Reference will now be made in detail to a present preferred embodiment of the invention, an example of which is illustrated in the accompanying drawings.

The present invention simplifies the operation of conventional cycloidal propeller mechanical offset control mechanisms and the mechanical kinematics of continuously varying the individual propeller blade-pitch angles during each revolution, e.g., as described in United Kingdom Patent Nos. 501,467; 438,317 and 504,877. This is achieved by concentrically configuring the drive, the offset control mechanism, the propeller hub, and the mechanical variable-pitch kinematics linkages of the propeller system and by reducing the number of rotating components to a minimum. Additionally, efficiency improvements are made to the propeller hub and blade tips.

Figure 1:
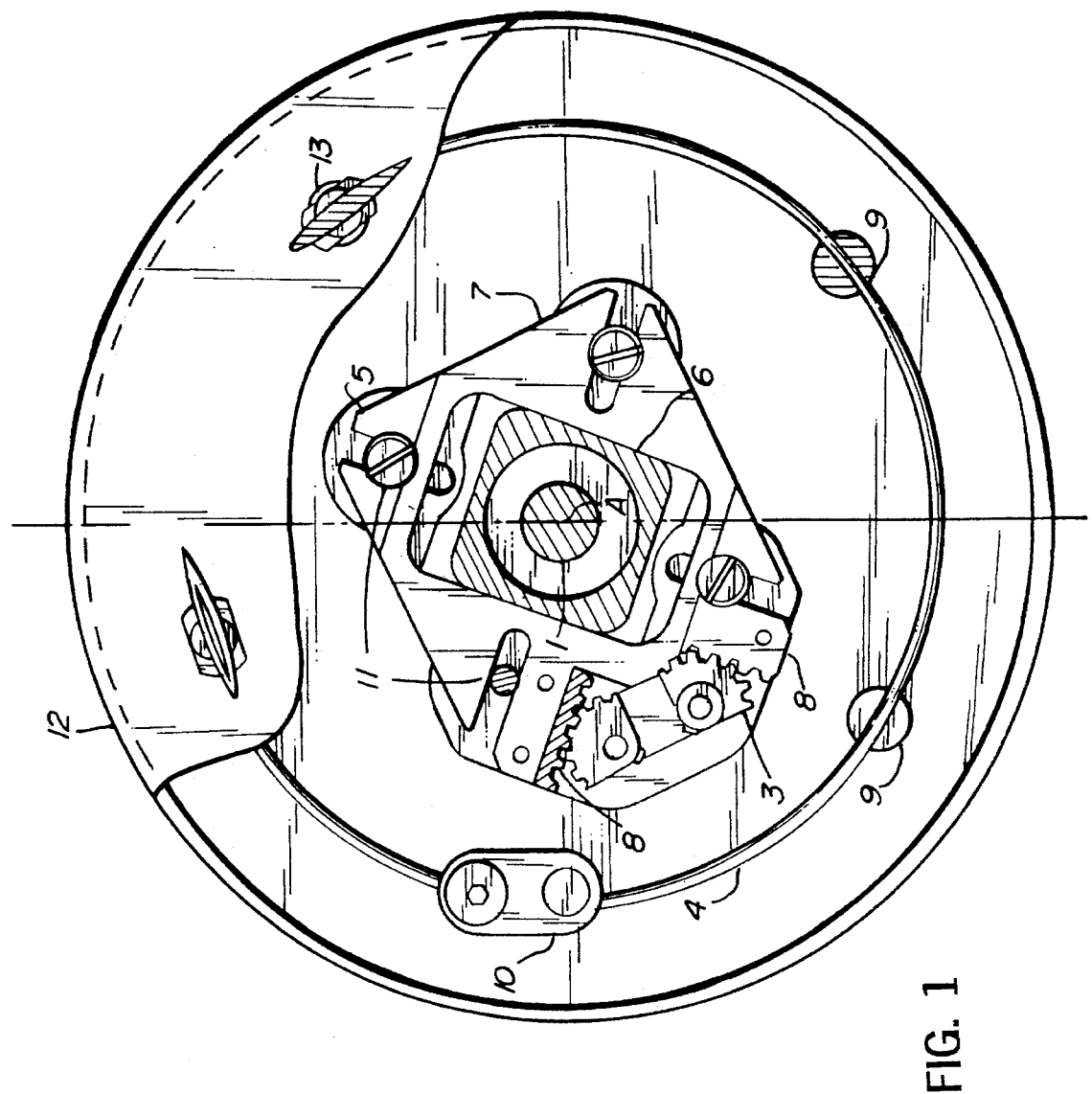
FIG. 1 is a plan view with parts of a rotating propeller hub removed, of a cycloidal propeller system according to the present invention and including an offset control mechanism.
Figure 3A:
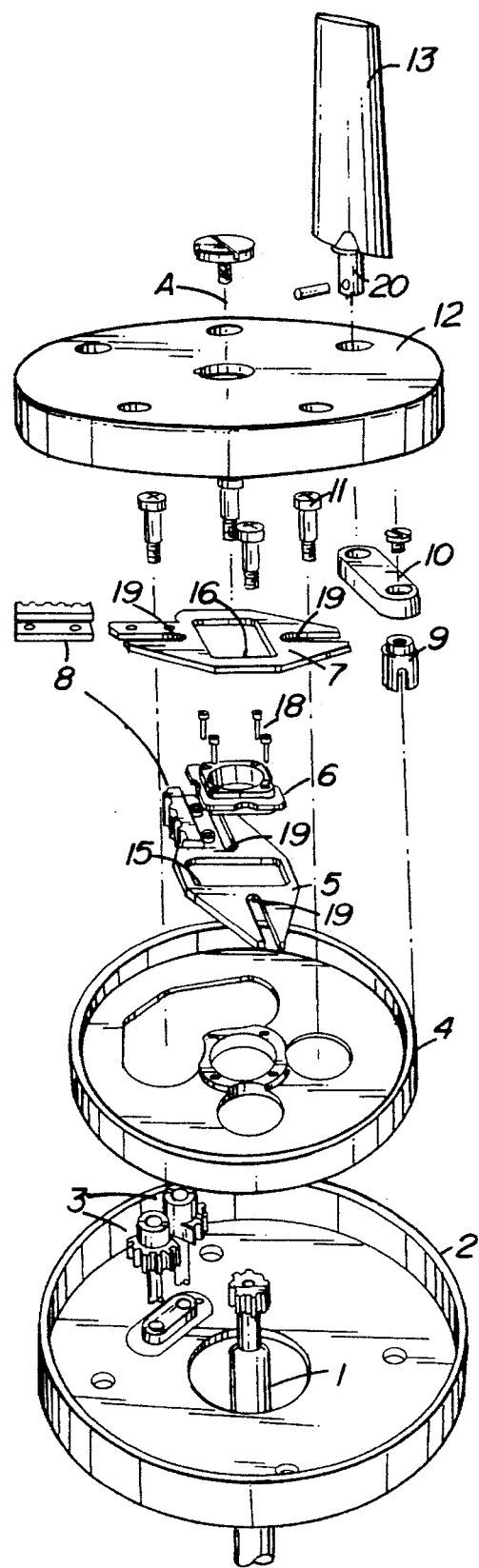
FIG. 3A is an exploded perspective view of the cycloidal propeller system hereof.

Referring to FIGS. 1 through 3, the overall configuration of the cycloidal propeller hub in accordance with the present invention, excluding the hinged blade-flap mechanism, the low-drag hub configuration and the propeller ground plane ring, is illustrated.

As part of an electric or hydraulic prime mover drive system, a central drive shaft 1 projects through a fixed-base plate 2 and an offset circular vector guide ring or track 4, and two X-Y offset control plates 5 and 7 all in a free-flooded area to provide a constant rotational speed to an outer propeller hub 12 rotatable about a central axis A. An off-center high-speed gear drive may be used in conjunction with a large reduction gear set in the outer rotating hub 12 to achieve the desired rotational propeller speed. The vector ring or track 4 slides on the fixed-base plate 2 in a plane normal to the central axis A and is offset to an eccentric position by X-Y slide plates 5 and 7 acting on a central square block 6. Thus, the axis B of the circular guide track 4 may lie coincident with or laterally offset from the central axis A. Block 6 has a circular hole through its center, the diameter of which is equal to the drive shaft diameter plus twice the maximum eccentricity of the track 4 relative to the hub 12. The outer vector ring 4 includes a raised circular slide track to guide the individual propeller blade pitch-change mechanisms 9 and 10. A flat-plate with a circular track or a grooved guide track could be used with a similar blade pitch-change mechanism to guide the trailing levers around the track. An anti-rotation ring between the vector ring and the fixed-base plate can be added if the friction and fluid drag forces warrant it.

As part of the offset control mechanism, two orthogonally related X-Y slide plates 5 and 7 having linear gear teeth 8 are respectively linearly displaceable in opposite directions by two rotary servo motor gears 3. Gears 3 project through the fixed-base plate 2 and an opening in the vector ring 4 in the free-flooded area. The orthogonal X-Y slide plates 5 and 7 which are concentric with the drive shaft 1 have rectangular guide slots 15 and 16, respectively, for receiving and moving the square block 6 of the vector ring 4 to any offset position. Block 6 is secured to the vector ring 4 by bolts 18 which pass through slide plate openings 15 and 16. The X-Y slide plates 5 and 7 can be located on the other side of the fixed base plate 2 and inside a hull for moving rotary through hull levers (not shown) for positioning the vector ring to the offset location.

As a further part of the offset control mechanism, four round-pin guide posts 11 mounted to the fixed-base plate 1 through openings in the vector plate 4 limit the movement of the X- and Y-slide plates 5 and 7 to the orthogonal X- and Y-directions. The larger heads of the guide posts 11 constrain movement of the plates 5 and 7 in the X-Y plane only and engage in slots 19 along the slide plates. Roller pin guides can be used to reduce the sliding friction if required. The vector ring 4 which is subjected to rotational sliding friction and fluid drag forces on or about the outer raised track is constrained from rotating by the X-Y slide plates 5 and 7 and the four guide posts 11 acting on block 6.

As part of the propeller blade-pitch kinematics system, in-line trailing levers 10 and swiveling guides 9 are fitted to the shafts 20 for each blade 13. The shafts 20 are mounted in bearings on the rotatable hub 12 and project below the hub to pivotally connect with levers 10. The guides 9 are fitted over the raised vector ring 4 and continuously slide around this variable offset circular track changing or levering the pitch of each variable-pitch propeller blade in accordance with the degree of offset of ring 4 relative to the circular orbit of the blades 13. A roller pin mechanism guided by a grooved circular vector plate may also be used in lieu of the raised track.

Figure 4:
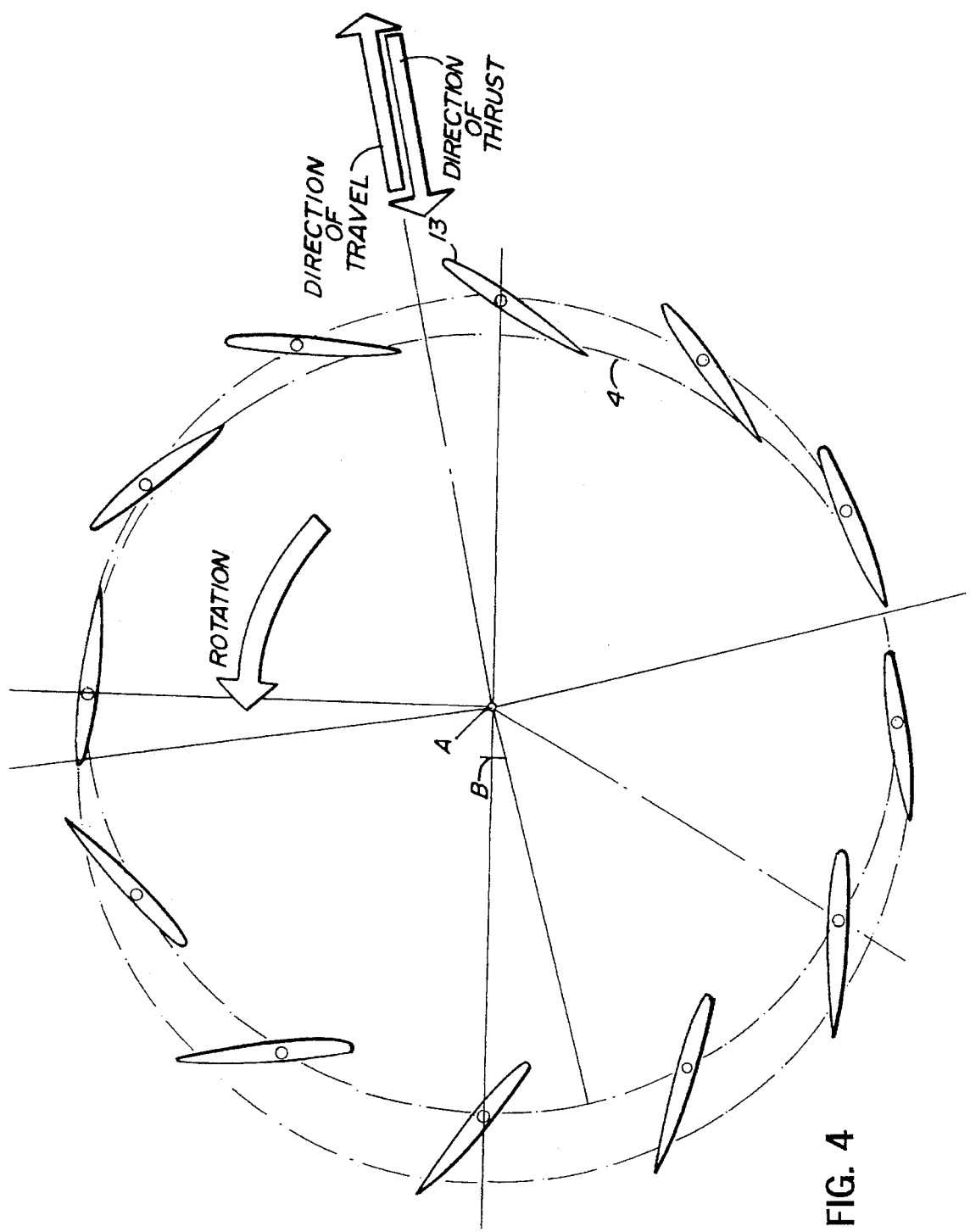
FIG. 4 is a schematic diagram illustrating various propeller blade-pitch angles at 30 degree intervals about the propeller blade orbit.

FIG. 4 illustrates the angular orientation of a variable-pitch propeller blade 13 at each 30 degree interval around the blade orbit. As can be seen from FIG. 4, during the forward half-cycle, the blade-pitch angles increase from zero pitch on the side approximately normal to the direction of thrust Th to a maximum in the direction of travel Tr and then decrease to zero on the opposite side, normal to the direction of thrust Th. During the aft half-cycle, the blade angles again increase from zero pitch to a greater maximum pitch angle and again return to zero pitch back at the starting point, i.e., after a complete revolution of the hub. It is desirable that during the aft half-cycle, the blade pitch angles be increased relative to the forward half-cycle blade pitch angles to effectively increase the velocity imparted by the forward half-cycle blades prior to exiting the propeller. The differential increase in angular-pitch relative to the forward half-cycle is determined by the offset distance, the diameter of the vector ring and the length of the variable-pitch blade levers. The vector ring 4 achieves this differential angular blade-pitch objective in a mechanically efficient manner by having a diameter larger than the diameter of the orbit of the blades made by their pivotal axes as the propeller rotates.

Although not shown in FIGS. 1, 2 and 3, the rotating propeller hub 12 can be configured as a simple, narrow profile flat-plate with raised variable-pitch propeller shaft 13 bosses on both sides of the propeller hub 12 to support the forces acting on the blade 13 shafts. This narrow profile propeller hub would reduce the rotational fluid drag of the hub. The side walls of the fixed-base plate 2 would have to be raised, in this case, as a guard against external entanglement.

Figure 3B:
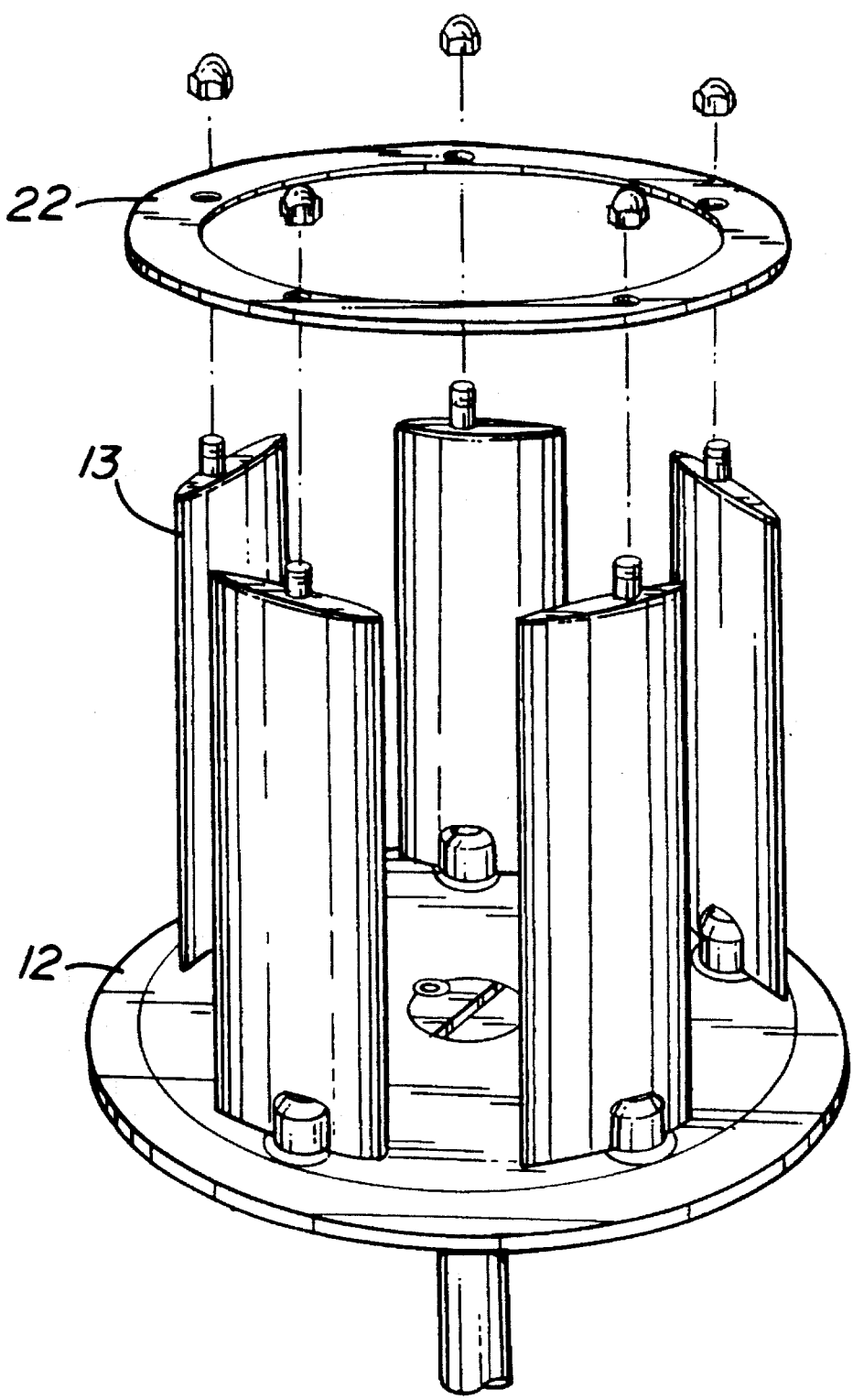
FIG. 3B is an exploded perspective view of the propeller blades and hub with the ground plane ring applied.

As shown in FIG. 3B, the propeller blades 13 may be fitted with a narrow circular ground plane ring 22 to reduce blade tip losses due to slow speed fluid slip off the ends of the blades and thereby increase propeller thrust, albeit with some drag penalty. Additionally, this ground plane ring would prevent blade flexing and external entanglement, as well as supporting more effective continuous cross-sectional profile propeller blades.

Figure 5:
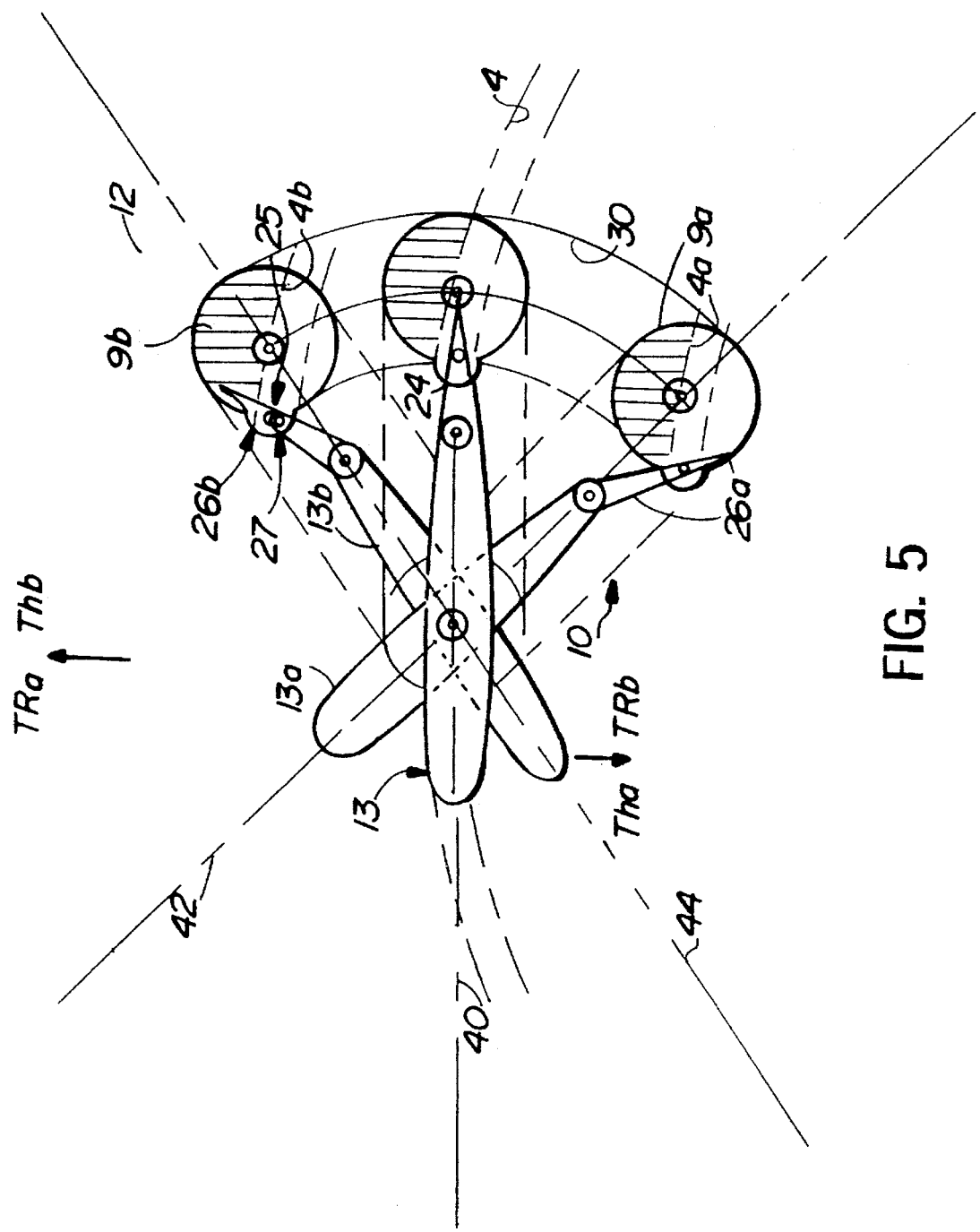
FIG. 5 is a schematic illustration of blade lever kinematics with a trailing blade-flap to provide additional propeller lift in the direction of motion.

As part of the propeller blade-pitch kinematics system as illustrated in FIG. 5, the swivel guides 9 may be fitted with small blade-flap levers 24 on top of the swivel guides 9 that oscillate as the in-line main blade levers 10 follow the offset vector ring 4. The blade-flap levers 24 extend through arcuate slots 30 in the propeller hub 12 to allow movement of the flap-levers 24 by the variable-pitch blade levers 10. These blade-flap levers 24 project forward and in-line with the variable-pitch blade levers 10 at zero blade pitch angle. Levers 24 mount a vertical control rod 25 which is disposed in the blade-flaps 26 in lower slots 27. The flap levers 24 act via the control rods 25 and the flap slots 26, on or about the center of pressure of the flap 26 to increase the flap angles relative to the blades 13. These blade-flap levers 24 will increase the pressure on the inside or high pressure-side of the blades during the forward and aft half-cycles, thereby increasing the lift from each blade and the overall propeller thrust.

With the cycloidal propeller rotating at a constant speed and all propeller blades at zero pitch, the vector ring and the propeller blade orbit are concentric with one another, i.e., the central axis A and the axis B of vector ring 4 are coincident. As the steering and throttle system is offset in the desired direction of motion, its control system signals the dual rotary servo motors to rotate their output shaft rotary gears 3 to move the two orthogonal X-Y slide plates 5 and 7 linearly in the direction of thrust Th and proportional to the magnitude of the offset. These slide plates with their rectangular guide slots displace the concentric square block 6 off-center to a corresponding offset position as determined by the steering/throttle system. The circular guide track or vector ring 4 is thus moved with block 6 to the offset position in the direction of thrust.

The vector ring 4 is now no longer concentric with the propeller blade orbit. Rather, it overlaps the blade orbit circle. While the propeller blades travel around their fixed rotating orbit, the variable-pitch blade lever guides 9 travel around the offset vector ring 4. Near the intersection points of the two circles, the lever guides 9 reduce the blade-pitch to zero. As noted previously, the vector ring is preferably slightly larger in diameter than the blade orbit diameter. The maximum linear offset distance in the forward half-cycle is therefore correspondingly less than the maximum linear offset distance in the aft half-cycle. Consequently, the various blade angles of attack, as determined by the offset and the blade levers, are similarly, always less in the forward half-cycle relative to the aft half-cycle (the forward and aft half-cycles are illustrated in the right and left hand portions of FIG. 4). As a result, the blades in the aft half-cycle can impart an increased velocity to the fluid propelled by the forward half-cycle blades but in a direction opposite to, yet proportional with, the steering/throttle offset. The resulting force provides motion in a direction Tr opposite to the propeller thrust Th.

All of the above control mechanical components are non-rotating and in free-flooded water. The continuously rotating propeller components are limited to the drive shaft 1, the propeller hub 12, propeller blades 13 with their kinematics levers 10, guides 9 and the ground plane ring 22.

The propeller hub provides a supporting base for the parallel variable-pitch propeller blades to rotate about their orbit. A narrow profile propeller hub with a small wetted surface will lower the rotational hub drag of the propeller.

Although a rotating propeller blade tip ground plane ring 22 will increase the propeller drag, this ground plane will reduce the water slippage or shedding off the ends of the blades, thereby improving the propeller efficiency, particularly at lower speeds. Additionally, this ground plane will prevent entanglement, blade flexing and provide support for continuous cross-sectional profile blades which will increase propeller thrust.

If additional lift is required from the propeller blades, the cycloidal propulsion system herein may be provided with the blade-flap levers. With the cycloidal propeller rotating at a constant speed and all blades at zero pitch, the variable-pitch propeller blades, the variable-pitch blade levers 10 and the flap levers 25 are all in-line and tangential to the blade orbit circle at the variable-pitch blade pivot points. The composite illustration of FIG. 5 illustrates the blade 13 and blade-flap 26 in three positions; a zero pitch angle 40 relative to the blade orbit, a maximum pitch angle 42 in the forward half-cycle, and a maximum pitch angle 44 in the aft half-cycle, the vector ring being designated 4, 4a and 4b, respectively, for those pitch angles. With the cycloidal propeller rotating at a constant speed and a thrust offset applied to the vector ring, the swivel guide will advance from the zero blade-pitch position on the propeller side normal to the direction of the offset, and start the inward oscillation of the blade orbit circle while traversing the vector ring in the forward half-cycle as illustrated by the blade 13a, flap lever 26a, and swivel guide 9a in the composite illustration of FIG. 5. This increasing, inward rotation of the swivel guide 9a as the blade lever increases the pitch angle, i.e., the angle of attack of the blade 13a, causes the blade-flap 26a to increase the angular difference between the main blade and the flap in the direction of thrust $Th_a$ until the maximum main blade lever angle and flap angle is achieved as illustrated. As the blade passes the maximum angle-of-attack in the forward half-cycle at approximately the direction of travel $Tr_a$, and the blade lever starts to close, the angular difference between the variable-pitch blade and the flap will gradually decrease until zero blade and flap pitch 40 is again reached on completion of the forward half-cycle. The swivel guide 9b now starts to oscillate outward of the propeller blade orbit circle (illustrated at 9b relative to vector ring circle 4b) as the main blade lever starts to open again. As this occurs, the flap lever 24 again starts to increase the angular difference between the variable-pitch blade 13b and the flap 26b but on the opposite side of the blade, yet in the same direction of thrust $Th_b$. As the main blade angles-of-attack increase in the aft half-cycle, so do the flap angles relative to the blade. On passing the maximum blade angle-of-attack in the aft half-cycle at approximately the direction of travel $Tr_b$ the levers start to close again, both the variable-pitch blade and the flap angles reduce to zero pitch back at the starting point as illustrated by the zero pitch angle 40.

This action will continue for each revolution or until the thrust magnitude or direction is changed. If a reduced thrust magnitude is selected, the main blade angles-of-attack and the flap angles will be proportionally reduced. This additional action by the flap kinematics is all controlled by the vector ring offset. The dual action of the propeller blade and the blade-flap will significantly increase the overall thrust of cycloidal propellers.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A cycloidal propeller system comprising:

a fixed base;

a propeller hub rotatable about a central axis and mounting a plurality of circumferentially spaced propeller blades for rotation therewith about the central axis, said hub mounting said blades for pivotal movement about blade axes generally parallel to said central axis whereby the axes of said blades define a circular orbit upon rotation of said hub about said central axis;

a member carrying a circular track having an axis extending in the direction of said central axis and carried by said base for non-rotational movement relative to a base in a plane normal to said central axis whereby said track is movable between positions locating the axis of the track offset from and coincident with the central axis, respectively;

means for moving said member in said plane to offset the axis of said track relative to said central axis;

each said blade having a lever and a guide carried by said hub for rotation therewith about said central axis, said guides being engageable with said track such that said guides and said levers change the pitch of the blades in response to movement of said member in said plane offsetting the track axis relative to the central axis thereby to produce thrust in a predetermined direction in response to rotation of said blades about said central axis;

the diameter of said track being larger than the diameter of said orbit such that, upon movement of said member to offset said track axis relative to said central axis, the blade pitch angles in a forward half-cycle increase from zero pitch on a side of said orbit approximately normal to the predetermined direction of thrust, to a maximum on the forward side of said orbit, and then decrease to zero pitch on an opposite side of the orbit normal to the direction of thrust and, in an aft half-cycle, increase from zero pitch at said opposite side of the orbit to a maximum pitch angle on the aft side of said orbit and then return to zero pitch at the completion of one revolution of said hub, the maximum pitch angle on the aft side of said orbit being greater than the maximum pitch angle on the forward side of said orbit.

2. A cycloidal propeller system comprising:

a fixed base;

a propeller hub rotatable about a central axis and mounting a plurality of circumferentially spaced propeller blades for rotation therewith about the central axis, said hub mounting said blades for pivotal movement about blade axes generally parallel to said central axis whereby the axes of said blades define a circular orbit upon rotation of said hub about said central axis;

a member carrying a circular track having an axis extending in the direction of said central axis and carried by said base for non-rotational movement relative to said base in a plane normal to said central axis whereby said track is movable between positions locating the axis of the track from and coincident with the central axis, respectively;

means for moving said member in said plane to offset the axis of said track relative to said central axis;

each said blade having a lever and a guide carried by said hub for rotation therewith about said central axis, said guides being engageable with said track such that said guides and said levers change the pitch of the blades in response to movement of said member in said plane offsetting the track axis relative to the central axis thereby to produce thrust in a predetermined direction in response to rotation of said blades about said central axis;

said moving means including a pair of plates mounted for linear movement in directions normal to one another and parallel to said plane and a drive element coupled to said plates for movement in response to movement of said plates, said drive element being connected to said member to move the member in response to movement of said plates.

3. A system according to claim 2 including means connected to said base for guiding each of said plates for linear movement, and a drive mechanism connected to each plate for linearly moving said plates to move said member.

4. A system according to claim 3 wherein each of said plates has an opening for receiving a portion of said drive element whereby the element in said openings follows the movement of said plates.

5. A cycloidal propeller system comprising:

a fixed base;

a propeller hub rotatable about a central axis and mounting a plurality of circumferentially spaced propeller blades for rotation therewith about the central axis, said hub mounting said blades for pivotal movement about blade axes generally parallel to said central axis whereby the axes of said blades define a circular orbit upon rotation of said hub about said central axis;

a member carrying a circular track having an axis extending in the direction of said central axis and carried by said base for non-rotational movement relative to said base in a plane normal to said central axis whereby said track is movable between positions locating the axis of the track from and coincident with the central axis, respectively;

means for moving said member in said plane to offset the axis of said track relative to said central axis;

each said blade having a lever and a guide carried by said hub for rotation therewith about said central axis, said guides being engageable with said track such that said guides and said levers change the pitch of the blades in response to movement of said member in said plane offsetting the track axis relative to the central axis thereby to produce thrust in a predetermined direction in response to rotation of said blades about said central axis;

the diameter of said track being larger than the diameter of said orbit such that, upon movement of said member to offset said track axis relative to said central axis, the blade pitch angles in a forward half-cycle increase from zero pitch on a side approximately normal to the predetermined direction of thrust, to a maximum on the forward side of said orbit, and then decrease to zero pitch on an opposite side of the orbit normal to the direction of thrust and, in an aft half-cycle, increase from zero pitch at said opposite side of the orbit to a maximum pitch angle on the aft side of said orbit and then return to zero pitch at the completion of one revolution of said hub, the maximum pitch angle on the aft side of said orbit being greater than the maximum pitch angle on the forward side of said orbit, each said lever and said guide trailing the associated blade as said blade is rotated about said central axis, said moving means including a pair of plates mounted for linear movement in directions normal to one another and parallel to said plane and a drive element coupled to said plates for movement in response to movement of said plates, said drive element being connected to said member to move the member in response to movement of said plates.

6. A cycloidal propeller system comprising:

a fixed base;

a propeller hub rotatable about a central axis and mounting a plurality of circumferentially spaced propeller blades for rotation therewith about the central axis, said hub mounting said blades for pivotal movement about blade axes generally parallel to said central axis whereby the axes of said blades define a circular orbit upon rotation of said hub about said central axis;

a member carrying a circular track having an axis extending in the direction of said central axis and carried by said base for non-rotational movement relative to said base in a plane normal to said central axis whereby said track is movable between positions locating the axis of the track from and coincident with the central axis, respectively;

means for moving said member in said plane to offset the axis of said track relative to said central axis;

each said blade having a lever and a guide carried by said hub for rotation therewith about said central axis, said guides being engageable with said track such that said guides and said levers change the pitch of the blades in response to movement of said member in said plane offsetting the track axis relative to the central axis thereby to produce thrust in a predetermined direction in response to rotation of said blades about said central axis;

at least one of the blades including a flap coupled to the blade about a trailing edge thereof for pivotal movement about an axis extending in the direction of the central axis for varying the angle between said flap and said blade and means carried by said hub and coupled to said flap for cyclically varying the angle of the flap relative to the blade.

7. A system according to claim 6 wherein said coupling means, in a forward half-cycle of rotation of the hub, causes said flap to increase the angular difference between the blade and the flap from a side of said orbit approximately normal to the predetermined direction of thrust to a maximum on the forward side of said orbit and in the direction of thrust between the blade the flap from such maximum to zero difference on the opposite side of said orbit normal to the predetermined direction of thrust.

8. A system according to claim 6 wherein the blade pitch angles in a forward half-cycle increase from zero pitch on a side of said orbit approximately normal to the predetermined direction of thrust, to a maximum on the forward side of said orbit and then decrease to zero pitch on an opposite side of the orbit approximately normal to the direction of thrust and, in an aft half-cycle, increase from zero pitch at said opposite side of the orbit to a maximum pitch angle on the aft side of said orbit and then return to zero pitch at the completion of one revolution of said hub, said coupling means, in a forward half-cycle of rotation of said hub, causes said flap to increase from zero pitch relative to said blade on the side of said orbit approximately normal to the predetermined direction of thrust to a maximum on the forward side of said orbit and in the direction of thrust and then decrease from said maximum pitch to zero pitch on said opposite side of the orbit normal to the direction of thrust, and in an aft half-cycle of rotation of said hub, causes said flap to increase from zero pitch relative to said blade on said opposite side of said orbit approximately normal to the predetermined direction of thrust to a maximum pitch relative to said blade on the aft side of said orbit and in a direction generally opposite to the direction of thrust and then decrease to zero pitch relative to said blade on said side of said orbit approximately normal to the direction of thrust.

9. A cycloidal propeller system comprising:

a fixed base;

a propeller hub rotatable about a central axis and mounting a plurality of circumferentially spaced propeller blades for rotation therewith about said central axis, said hub mounting said blades for pivotal movement about blade axes generally parallel to said central axis whereby the axes of said blades define a circular orbit upon rotation of said hub about said central axis;

a member carrying a circular guide having an axis extending in the direction of said central axis and carried by said base for non-rotational movement relative to said base in a plane normal to said central axis whereby said track is movable between positions locating the axis of the guide offset from and coincident with the central axis;

means for moving said member in said plane to offset the axis of said guide relative to said central axis;

means carried by said hub for rotation therewith about said central axis and engageable with said guide and said blades for changing the pitch of the blades in response to movement of said member in said plane offsetting the guide axis relative to the central axis thereby to produce thrust in a predetermined direction in response to rotation of said blades about said central axis;

the diameter of said guide being larger than the diameter of said orbit such that, upon movement of said member to offset said guide axis relative to said central axis, the blade pitch angles in a forward half-cycle increase from zero pitch on a side of said orbit approximately normal to the predetermined direction of thrust to a maximum on the forward side of said orbit and then decrease to zero pitch on an opposite side of said orbit normal to the direction of thrust and, in an aft half-cycle, increase from zero pitch at said opposite side of said orbit to a maximum pitch angle on the aft side of said orbit in the direction of thrust and then return to zero pitch at the completion of one revolution of said hub, the maximum pitch angle on the aft side of said orbit being greater than the maximum pitch angle on the forward side of said orbit.

10. A system according to claim 9 wherein at least one of the blades includes a flap coupled to the blade about a trailing edge thereof for pivotal movement about an axis extending in the direction of the central axis for varying the angle between said flap and said blade and means carried by said hub and coupled to said flap for cyclically varying the angle of the flap relative to the blade.

11. A cycloidal propeller system comprising:

a fixed base;

a propeller hub rotatable about a central axis and mounting a plurality of circumferentially spaced propeller blades for rotation therewith about said central axis, said hub mounting said blades for pivotal movement about blade axes generally parallel to said central axis whereby the axes of said blades define a circular orbit upon rotation of said hub about said central axis;

a member carrying a circular guide having an axis extending in the direction of said central axis and carried by said base for non-rotational movement relative to said base in a plane normal to said central axis whereby said track is movable between positions locating the axis of the guide offset from and coincident with the central axis;

means for moving said member in said plane to offset the axis of said guide relative to said central axis;

means carried by said hub for rotation therewith about said central axis and engageable with said guide and said blades for changing the pitch of the blades in response to movement of said member in said plane offsetting the guide axis relative to the central axis thereby to produce thrust in a predetermined direction in response to rotation of said blades about said central axis;

said moving means including a pair of plates mounted for linear movement in directions normal to one another and parallel to said plane and a drive element coupled to said plates for movement in response to movement of said plates, said drive element being connected to said member to move the member in response to movement of said plates.

12. A system according to claim 11 including means connected to said base for guiding each of said plates for linear movement, and a drive mechanism connected to each plate for linearly moving said plates to move said member, each of said plates having an opening for receiving a portion of said drive element whereby the element in said openings follows the movement of said plates.

* * * * *